United States Patent
Bates

[19]

[11] 3,886,553

[45] May 27, 1975

[54] COORDINATE LOCATING METHOD AND SYSTEM

[76] Inventor: John K. Bates, 240 Ridgefield Rd., Endicott, N.Y. 13760

[22] Filed: Mar. 15, 1973

[21] Appl. No.: 341,729

[52] U.S. Cl........ 343/112 R; 235/150.272; 340/6 R; 343/112 TC
[51] Int. Cl............................................. G01s 5/04
[58] Field of Search................. 343/112 R, 112 TC; 340/6 R; 235/150.272

[56] References Cited
UNITED STATES PATENTS

| | | | |
|---|---|---|---|
| 3,249,911 | 5/1966 | Gustafsson...................... | 343/112 R |
| 3,289,207 | 7/1963 | Lent................................ | 343/112 R |
| 3,518,674 | 6/1970 | Moorehead et al............. | 343/112 R |
| 3,648,034 | 3/1972 | Lawson........................... | 235/150.272 |
| 3,750,178 | 7/1973 | Hulst............................... | 343/112 R |

Primary Examiner—Maynard R. Wilbur
Assistant Examiner—Richard E. Berger
Attorney, Agent, or Firm—Plumley & Tyner

[57] ABSTRACT

A method and system are disclosed for measuring the geographical position of emitters such as radio transmitters accurately, simply, and inexpensively. In a particular application, the radio transmitters, which emit pulse type signals, may be located on small boats, for use in case of trouble, or on emergency vehicles. Widely spaced trilateration receiver stations are positioned to cover a preselected area and to receive the emitted signals. The relative time of arrival of each individual signal pulse at the several receiver stations is digitized and transmitted by way of communication channels to a central processing unit. At the central unit the time of arrival pattern of the pulses from the several receivers is compared with a pattern recognition matrix of previously mapped data. The central unit, being capable of responding only to preselected signal patterns, eliminates signals which originate outside of the preselected field of view and produces emitter location coordinates in digital numbers.

The pattern recognition matrix is in the form of a logic array arranged to represent predetermined, discrete time delay increments as reference points in the geographical space under observation. The logic array produces coarsely quantized time-variable signal outputs. These time-variable output signals are interpolated in an array of variable-gain weighting devices using a centroid computing technique to finely locate the geographical coordinates of the transmitter.

The system and method described have application to locating positions both in geographic as well as in geometric coordinate space. In the latter, the time of arrival pulse patterns are derived from time encoded analogs of physical measurements from various sensors where the measured parameters have a continuous functional relationship. There is stored in the matrix relatively coarse reference data containing the functional pattern. The input data, being continuous or finely quantized, is applied to the matrix. By virtue of the interpolation array, a smooth measuring of the position of the sample in the functional space is produced. This position is then interpreted by the user of the system. Stated in another manner, the method of this invention enables the use of prestored functional information to give the equivalent result of having stored a large amount of reference data.

19 Claims, 16 Drawing Figures

Patented May 27, 1975  3,886,553

Patented May 27, 1975 3,886,553

COORDINATE LOCATING METHOD AND SYSTEM

BACKGROUND OF THE INVENTION

This invention relates to a method and system of locating emitters.

Over the years there has been a great need for locating sources of energy, whether they be electromagnetic, acoustic, seismic, or other. These sources of energy or emitters may be man-made or supplied by nature as in the case of lightning. The problems of locating and identifying lightning strokes, especially those which are capable of starting fires, has long remained without a satisfactory solution. Locating an emitter is often necessary for law enforcement agencies in searching for clandestine, intermittent, or frequency jumping transmitters. Other applications exist in aircraft traffic control, automatic vehicle monitoring, biological tracking systems, and the like. In the case of marine emergencies, for example, there is the need for locating boats, buoys and the like. In this application, a transmitter is placed upon the boat or a buoy to be carried by the boat and it is desirable and/or necessary to determine its precise location either for tracking purposes or for rescue purposes. One of the problems encountered in this application is that, particularly in the case of small boats, the buoys or emergency transmitting equipment carried usually is of relatively low power and the signals may be lost in the background noise or the emitter improperly or inaccurately located. This is particularly true when the range under inspection is relatively broad in which case signals from many extraneous and undesired sources tend to interfere with the reception of the desired signal and cause gross errors in location.

Other applications include those where the emitter is a source of acoustic energy. These sources would include intruders and the like who are to be monitored and located. An entire warehouse can be monitored in this manner. It is also appropriate to monitor and locate noises, gun fire, the underwater location of sonar buoys, fish, swimmers and the like. In seismic applications, it is often desirable to locate sources of various seismic waves.

There are literally dozens of methods and systems for determining emitter locations which have been tried or are presently being tried. Trilateration and time-of-arrival methods have received special attention because of their potentially high accuracy. The need for a suitable emitter location technique is evidenced by the hundreds of millions of dollars which have been spent in research and development. Nevertheless, the search for a really satisfactory emitter location system goes on.

While some of these systems are in use and have been reasonably successful from a technical viewpoint, they have not been acceptable to a large number of potential users. This is due primarily to their high cost, complexity, size, data processing difficulties, insufficient accuracy, the need for wideband data links and precise clocks, susceptability to propagation anomalies and interference, and special operating restrictions.

Accordingly, it is an object of this invention to obviate many of the disadvantages of the prior art emitter location systems.

Another object of this invention is to obviate many of the disadvantages of prior art methods for determining emitter locations.

An additional object of this invention is to provide an improved system that is simple and low cost for the accurate determination of emitter locations A further object of this invention is to provide an improved method for locating emitters which eliminates emitter signals originating outside of a predetermined field of view.

An additional object of this invention is to provide an improved system for locating emitters which can operate in the frequency bands allocated for marine use.

Another object of this invention is to provide an improved system for locating emitters which allows the use of narrowband data links.

BRIEF DESCRIPTION OF THE PREFERRED EMBODIMENT

According to the method of this invention, an emitter is a continuous functional space, defined by at least a pair of parameters, is located by encoding the parameters defining the emitter location in terms of relative time delay differences between first and second manifestations emanating from the emitter, and comparing the time of arrival pattern of the manifestations with a catalog of predetermined sets of relative time patterns of the manifestations corresponding to different reference points in the space. In this manner, the coarse location of the emitter is determined. The comparison also provides coarsely quantized time variable signal outputs where this variation is proportional to functional distance from adjacent reference points.

In a specific embodiment of the method of the invention, the largest parameter or manifestation is identified and established as a zero time manifestation. Smaller parameters are subtracted from the largest parameter to form manifestations of a numeric time of arrival pattern. This numeric time of arrival pattern is then compared with a catalog array of predetermined time of arrival location patterns. Those elements of the catalog array closest to the emitter locate the emitter. Coordinates of the emitter may be displayed for readout purposes.

The system of this invention for locating an emitter in a continuous functional space defined by at least a pair of parameters includes a sensor means for receiving emanations from the emitter, means for encoding the received emanations in terms of manifestations representing the relative time delay differences between the emanations derived from different ones of the sensing means, and comparator means for comparing the time of arrival pattern of the manifestations with a catalog of stored manifestations corresponding to predetermined sets of relative time difference patterns of the manifestations corresponding to different reference points in the space and providing discrete output manifestations corresponding to the coarse location of the emitter in relation to the reference points.

In a preferred form of the invention, the comparator means is a recognition logic array constructed to represent predetermined discrete time delay increments of the manifestations as said reference points, the logic array providing coarsely quantized, time-variable manifestations corresponding to the location of the emitter. Interpolation means are provided for interpolating the time-variable manifestations, thereby to finely locate the emitter in space.

In a typical application the emitter is a transmitter located at some point to be located. Each sensor means includes a first receiver for receiving the transmitted signals from the emitter, a second receiver for receiving a common time reference signal, counting means for establishing a count signal corresponding to the time interval between the reference signal and the transmitted signal, thereby to provide a time of arrival count for each sensor. This time of arrival count is transmitted by conventional communication means to the central processing unit where it is converted to analog form as a time-varying signal. The time-varying signal from each of the sensors is then applied to separate shift registers where they are sequentially applied to the several inputs of a logic array which sequentially interrogates all of the defined combinations of the array until a match is ascertained which corresponds to the emitter location. The output of the array is one or more coarsely quantized time-varying signals which are interpolated both to correct for transmission errors and to finely locate the emitter source location.

Aside from locating purely geographic points, the time of arrival patterns used in this invention may be used in geometric coordinant space. In this application, the patterns are derived from time-encoded analogs of physical measurements from various sensors where the measured parameters have a continuous functional relationship. The purpose here is to store in the matrix relatively coarse reference data containing the functional pattern. The input data being continuous or finely quantized is applied to the matrix and by virtue of the interpolation array, a smooth measurement of the position is interpreted by the user of the system and may be transmitted to appropriate control devices.

Broadly stated, this invention enables an automatic system control computer, which uses prestored functional information, to store a small amount of reference data which then gives the equivalent result of having stored a large amount of reference data. The object is to simplify and to reduce the cost of certain types of measurement and control systems.

BRIEF DESCRIPTION OF THE DRAWINGS

The novel features that are considered characteristic of this invention are set forth with particularity in the appended claims. The invention, itself, however, both as to its organization and methods as well as additional objects and advantages thereof will best be understood from the following description when read in connection with the accompanying drawings, in which:

DESCRIPTION OF THE PREFERRED EMBODIMENT

According to the system of this invention, emitters such as radio transmitters located at various geographical positions may be located accurately, simply and inexpensively. For example, if it is desired to monitor boating traffic 10 located in the upper Chesapeake Bay as depicted, for example, in FIG. 1, the Bay is broken up into two trilateration units termed triad 1 and triad 2. Each triad typically may cover two thousand square miles. The triads are interlinked to give coverage which roughly matches the shoreline features. The first triad is composed of three receiving stations 12, 14 and 16, located on the vertices of an equilateral triangle. In like manner, the second triad (equilateral triangle) is made up also of the two receivers 14 and 16, together with a third receiver 18. It may thus be seen that two of the receivers, 14 and 16, find common usage in each of the triads, as will become apparent. Their function is to receive emitted electromagnetic energy and to transmit data derived therefrom onto a central point for analysis.

Figure 1:
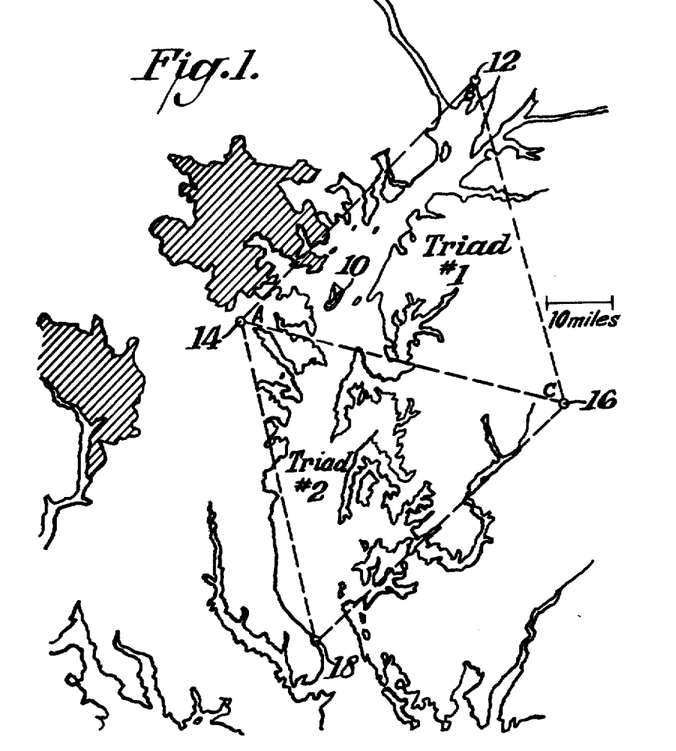
FIG. 1 is a map illustrating how a double triad system is used with this invention in geographic finding or trilateration in a typical area such as the Chesapeake Bay region.
Figure 2:
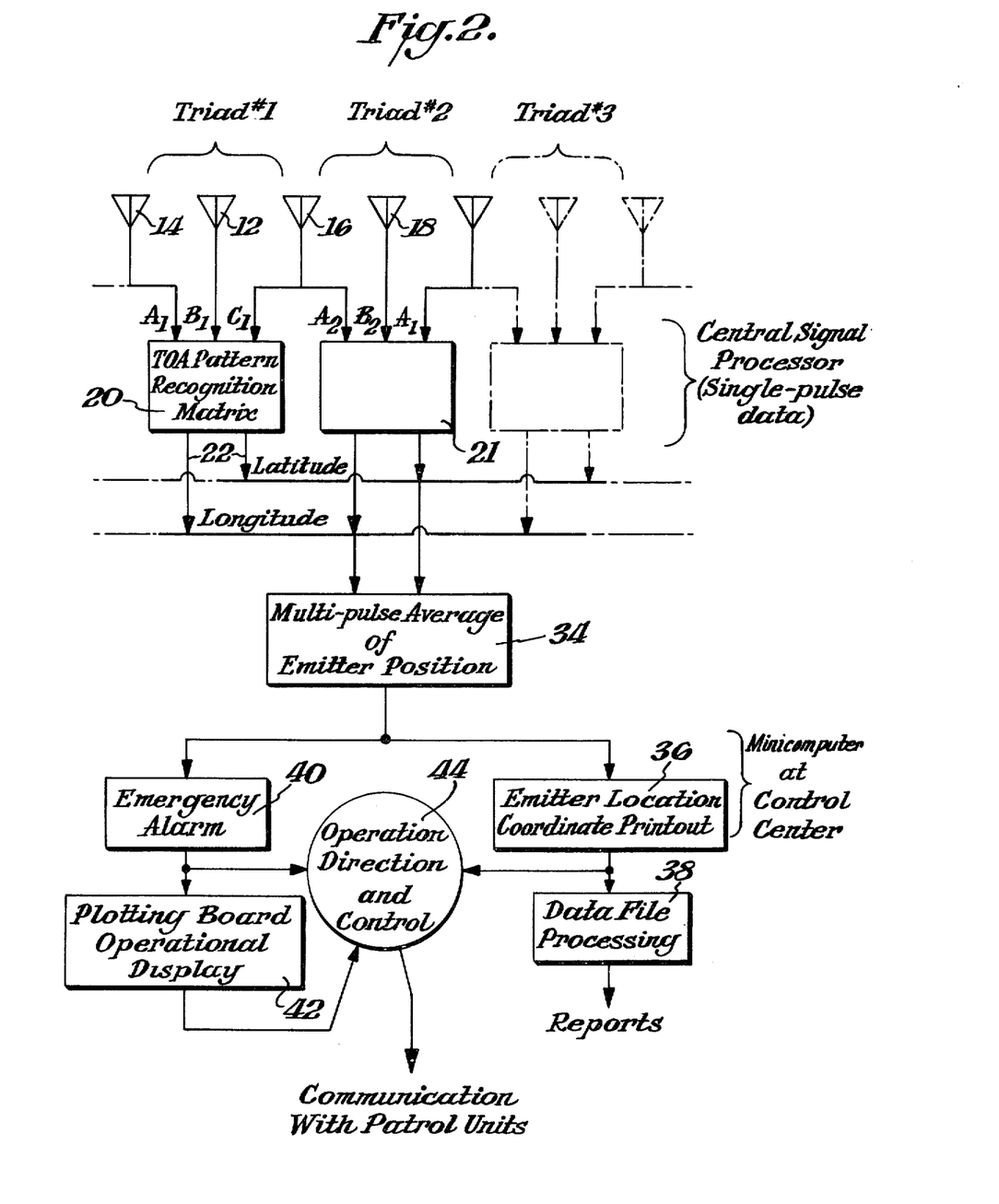
FIG. 2 is a block flow diagram of an emitter locating system constructed in accordance with this invention using the two triads illustrated in FIG. 1.

A typical boat monitoring system using the two triads illustrated in FIG. 1 is depicted in block form in FIG. 2. Each of the receivers in the first triad, depicted by the antennae 12, 14 and 16 in FIG. 2, are connected to a time of arrival recognition matrix 20 which converts the received signals corresponding to locations A, B and C into latitude and longitude coordinates at its output 22.

Figure 3:
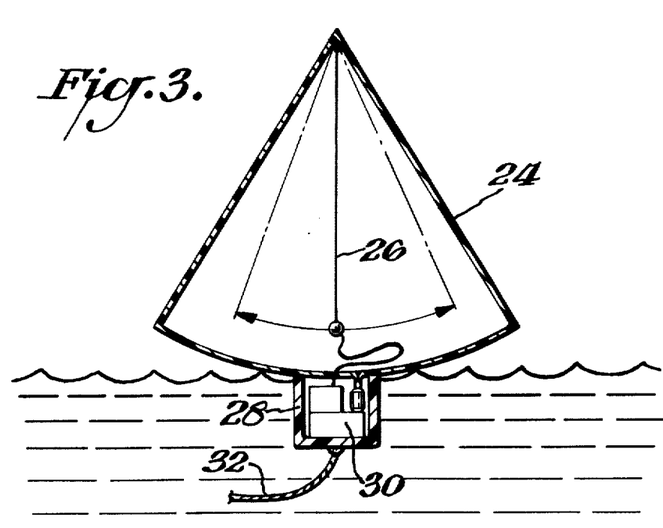
FIG. 3 is a schematic illustration of a typical emergency buoy type transmitter which may be carried on small boats for use in the system of this invention.

The emitter 10 (FIG. 1) may be a conventional radio transmitter used in marine navigation or it may take the form of an emergency pack such as that illustrated in FIG. 3. In this figure there is illustrated an emergency buoy in the form of an inflatable, conical mylar balloon 24 which has a built-in 1.5 meter antenna 26 connected to a plastic foam case 28 which houses a battery and radio transmitter 30. A tether line 32 is provided such that it may be anchored or held by the person in need of help. The antenna 26 preferably is a stiff wire antenna which uncoils when the emitter is activated such that it may swing from the peak of the conical balloon 24 to maintain a near vertical position within the balloon. Preferably, the transmitter may operate in the present assigned marine frequencies of 1.6 to 2 megacycles and may be designed to emit periodic pulses. These pulses, which are received at different times by the different receivers 12, 14 and 16 of the first triad are converted in the time of arrival pattern recognition matrix 20 into signals denoting the latitude and longitude coordinates of the emitter. The average of several such determinations may be taken by a suitable averaging unit depicted by the block 34 (FIG. 2), and may be passed on at a control center, for example, to a printout 36, data file 38, to provide an emergency alarm 40 or may be plotted on an operational display 42. All of these standard control center units are controlled by an operation direction control center 44 which may be a conventional computer or operator. It is from this point that appropriate action may be taken and directed such as the dispatch of a rescue boat and the like.

Figure 4:
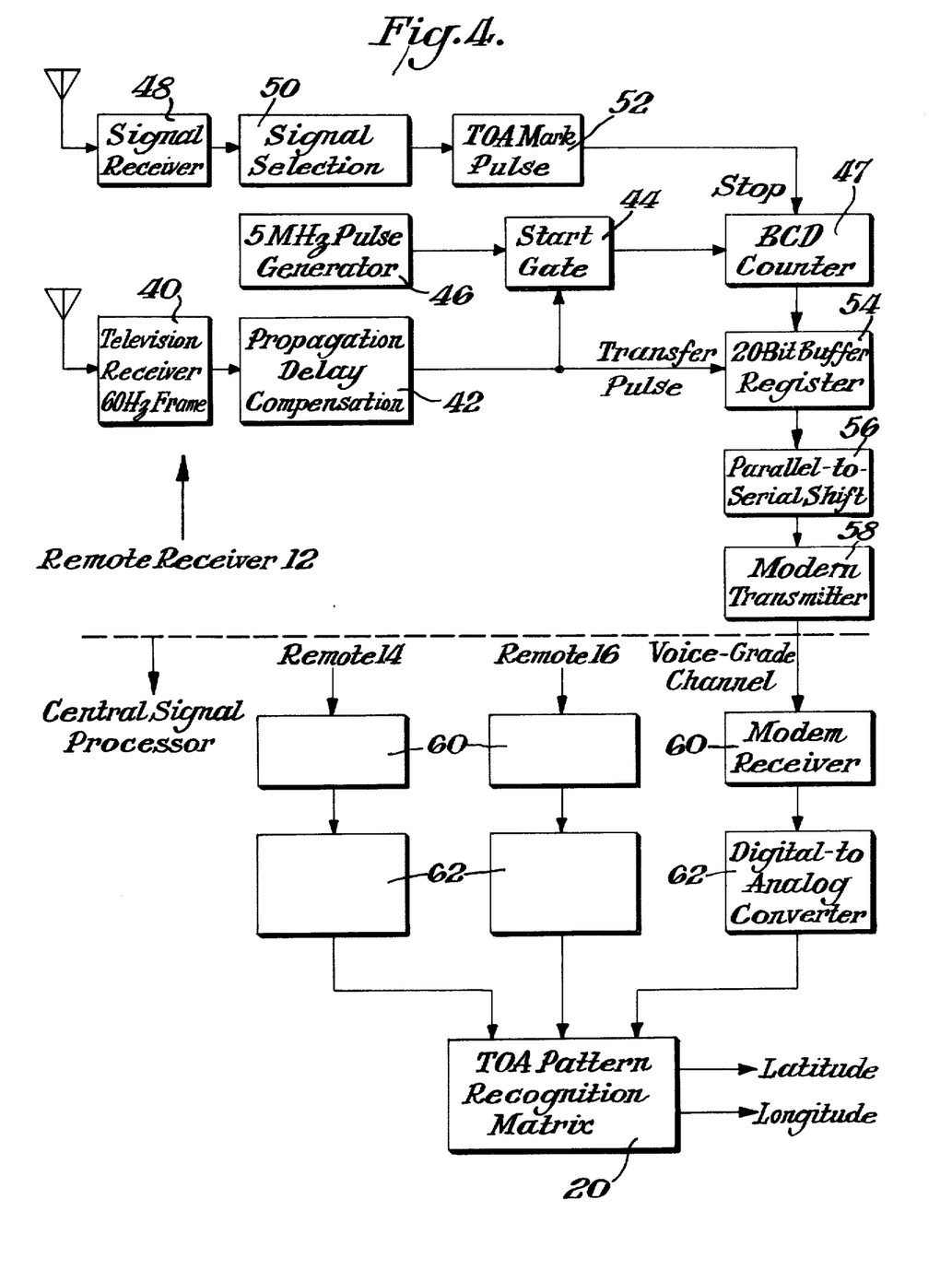
FIG. 4 is a block diagram of an emitter locating system constructed in accordance with this invention, illustrating a typical receiver, three of which are used in each triad, and depicting the manner in which information is received by the receiver and transmitted to a recognition matrix for a triad.

Information is transmitted from each receiver of a triad to the time of arrival pattern recognition matrix 20 using the sub-system depicted in FIG. 4. The function of this sub-system is to establish a time of arrival (TOA) pattern from the pulses received by each receiver 12, 14 and 16 of the triad. Information as to the precise time of arrival at each receiver is converted into digital form for transmission to the time of arrival recognition matrix 20. This system may be extended to encompass many triads as indicated. In another mode of operation also referred to as "multilateration", the additional triad coverage may be overlapped to simultaneously locate emitters within the same regions. Each such redundant independent location measurement can be used to improve system accuracy for single pulse intersection.

The second triad commonly uses two of the receivers denoted by the antennae 14 and 16 and also uses a third receiver denoted by the antenna 18. The signals corresponding to locations $A_2$, $B_2$, $A_1$ from these receivers are transmitted to a time of arrival matrix 21 for processing. For this purpose, a common reference signal is required for all of the receivers of each triad. While any accurate common reference source may be used, an ideally suitable source is that available from the 60 Hertz (Hz) frame synchronizing pulses which are transmitted from most television stations. Thus, for this purpose, each of the receivers 12, 14 and 16 for each triad are tuned to a common television channel. Each remote receiver includes a television receiver 40 which is adapted to receive and separate the frame synchronizing pulses. These frame synchronizing pulses 70 (FIG. 5) are passed through a propagation delay compensation unit denoted by the block 42. This may simply be a delay line of any suitable type which is capable of compensating for the differences in distance of the several receivers 12, 14 and 16 from the television station such that each receiver has a precise time reference. The output of the unit 42 is passed to a start gate 44 which gates 5 megahertz (MHz) clock pulses from a pulse generator 46 of conventional design into a binary coded decimal counter 47. The start count input to the counter 47 is received from the emitted signals received by the signal receiver 48. Signals from the receiver 48 are passed to a signal selection unit 50 which functions to separate and amplify the pulse signals 72, derived from the receiver, from background noise and interference. From there the signals are shaped into a square pulse accurately providing a time of arrival mark pulse 74. This mark pulse 74 is processed by the unit 52 to select only those pulses above a certain threshold level and is then passed onto the counter 47 for the purpose of stopping the count. It may be seen that the counter 47 for each receiver begins a count with the receipt of each syncrhonizing pulse, each 1/60 of a second, and counts until stopped by a pulse received from the emitter 10. The farther the receiver from the emitter, the larger the count. Since all receivers in a triad are timed to the same television station, the counts are indicative of the distance of the emitter from each receiver.

The output of the counter 47 is coupled to a 20 bit buffer register 54. The buffer register is adapted to receive the output of the counter 47 upon the receipt of the transfer pulse from the synchronizing signals received from the unit 42. Thus, these time reference pulses 72 empty the quantity in the counter 47 into the register 54 and then start the counter again. The output of the buffer register 54 is connected to a parallel to serial shift unit 56 such that the parallel presented pulses may be converted to serial form for application to a conventional modem transmitter 58 where they are transmitted over voice grade telephone channels or other suitable means to a modem receiver 60 of conventional type where they are again converted to digital form. A digital to analog converter 62 converts the digital signal into a time-varing pulse whose position in time represents the time of arrival of the signal from a particular receiver. This pulse is then passed onto a time of arrival pattern recognition matrix 20. The same matrix 20 receives inputs from the other receivers 14 and 16 of the triad, which are processed in like manner, and all three time-varying signals are applied to the pattern recognition matrix 20. The format of these time-varying signals will be described in conjuntion with FIGS. 7 and 8 and the details of a suitable pattern recognition matrix constructed in accordance with this invention will be described in conjuntion with FIG. 9.

Figure 5:
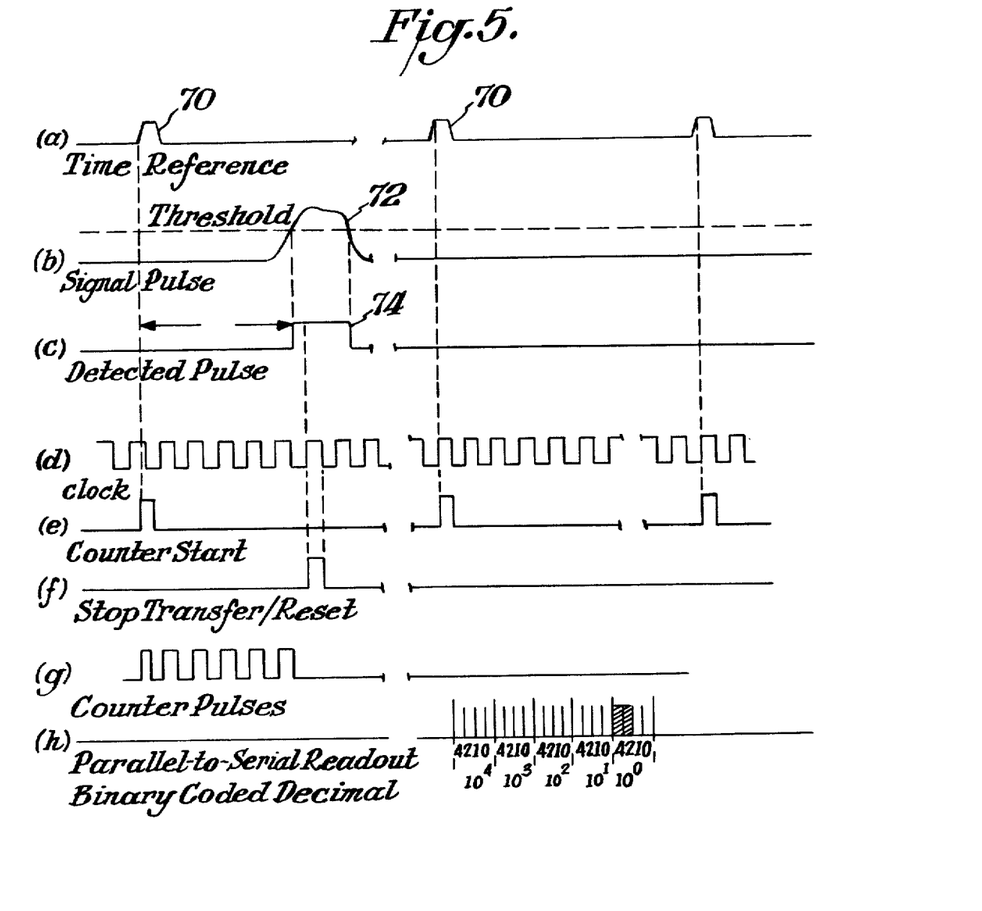
FIG. 5 depicts the plurality of wave forms that exist in each receiver while developing the digital time of arrival pattern at each receiver.
Figure 16:
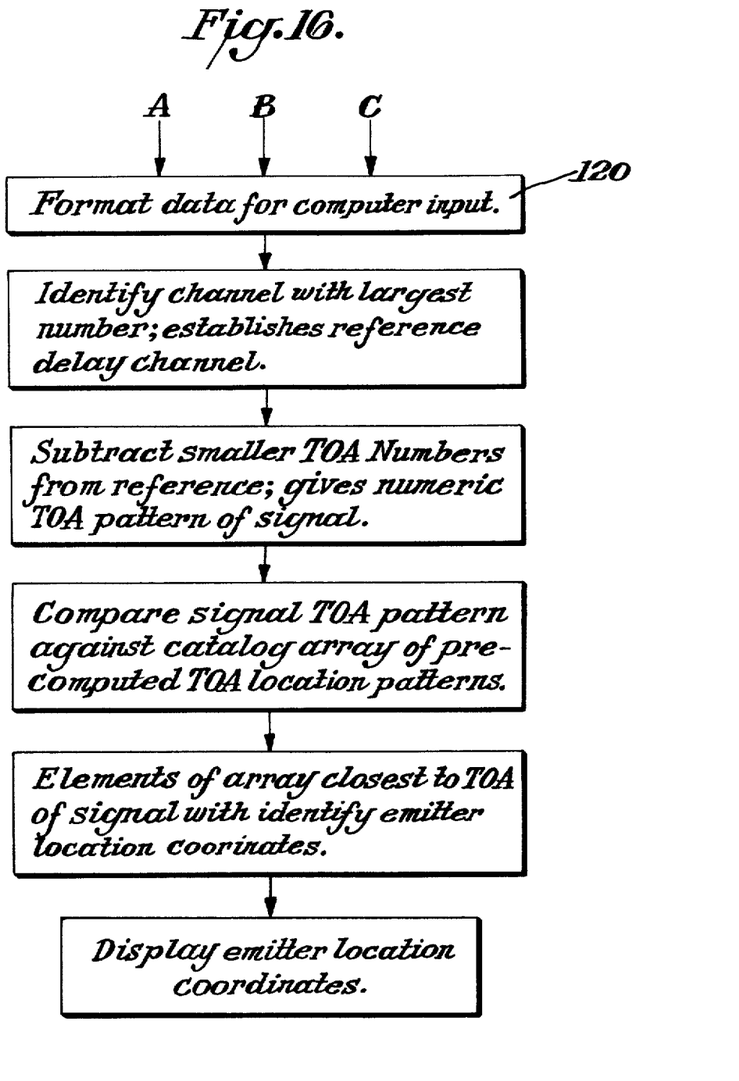
FIG. 16 is a block flow diagram of a method of locating emitters utilizing the system of this invention.

The operation of the remote receivers may be more easily understood with reference to the wave forms of FIG. 5. Thus, the top wave form A shows the periodic time reference pulse train that is received from the local television station. This train includes the regular 60 Hz television frame syncrhonizing pulses 70 occurring 60 times per second. The emitted pulse 72 from an emergency buoy, for example, is received as illustrated in the wave form D. This pulse is threshold detected by the signal selector 50 to provide a square pulse 74 as depicted in the wave form C. The arrival time of this detected pulse 74 is purely random with respect to the timing reference pulses 70. In like manner, the time base clock derived from the pulse generator 46 and depicted by the wave form D is not synchronized with respect to the time reference pulses. As noted, the time reference pulses 70 are used as counter start pulses and gate the pulses from the pulse generator 46 into the binary coded decimal counter 47. The counter 47 counts these pulses until it receives a stop pulse depicted by the wave form F coincident with the leading edge of the detected, squared pulse 74. The timing reference pulses 70 from the sync source operate to transfer the count in the counter 47 to a latch register 54 and to reset the counter to prepare for a new frame or count. The counter pulses after transfer to the buffer register 54 are then converted into serial form which are illustrated in the wave form H in binary coded decimal serialized form. Any conventional parallel-to-serial converter may be used. At this point the serialized binary coded decimal pulses are transmitted through the modem transmitted 58, thence to the central unit of that triad where they are received at a similar modem receiver 60. By resetting the counters at every frame period, errors do not accumulate. Furthermore, since the counting interval or frame is long relative to the total range of propagation delays spanned by the TOA pattern, the probability that a given time of arrival pattern interval will be split into two different frames is reduced. With the TOA signal information now in digital form at the modem receiver 60, the emitter location can be obtained in accordance with the system of this invention by either special purpose hardware, which will now be described, or by a software alogorithm in a general purpose computer which is depicted in FIG. 16.

Figure 6:
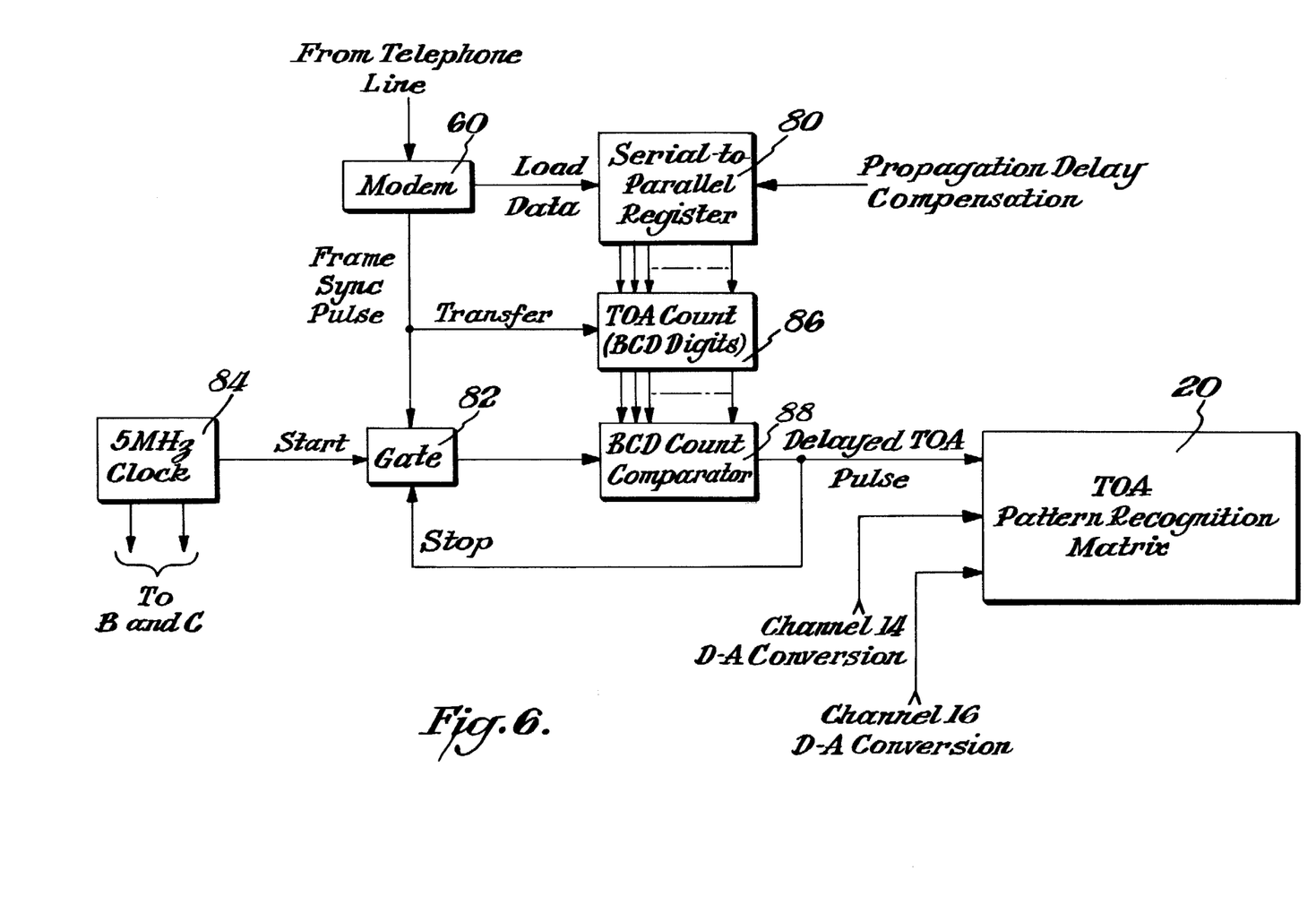
FIG. 6 is a block diagram of a typical digital to analog time conversion system used for converting the digitized pulses from each triad receiver into a time-varying analog pulse for application to the pattern recognition matrix.

To use hardware, the serialized digital signals must be converted back into an analog form whereby they have varying time positions or intervals corresponding to their relative arrival times at the several receivers of a triad. This may be accomplished by the sub-system illustrated in FIG. 6 where the serialized signals from the modem are loaded into a serial-to-parallel register 80 of conventional design. Also the frame synchronizing pulses from the modem 60, corresponding to the reference pulses 70 (FIG. 5) are passed to a gate 82 which gates 5 MHz clock pulses from a generator 84. This same generator 84 is also used in the conversion of the signals from the other two remote receivers 14 and 16 of the triad so that all operate from a common reference. The frame sync pulse from the modem 60 provides a suitable transfer signal which transfers the parallel presented digital signal from the register 80 into a TOA count register 86. The clock pulses from the gate 82 are passed to a binary coded decimal counter and comparator 88 which continues to count until its count matches the count in the TOA count register 86 at which time an output pulse is passed to the TOA pattern recognition matrix 20. This pulse which measures the time delay with respect to the frame is also passed back to close the gate 82 and await the next frame sync pulse. It is to be noted that a propagation delay compensation for the time reference signal may be introduced into the register 80, if desired, i.e., the register may be preset to compensate for the different propagation times in place of the device 42.

Figures 7, 8, 12:
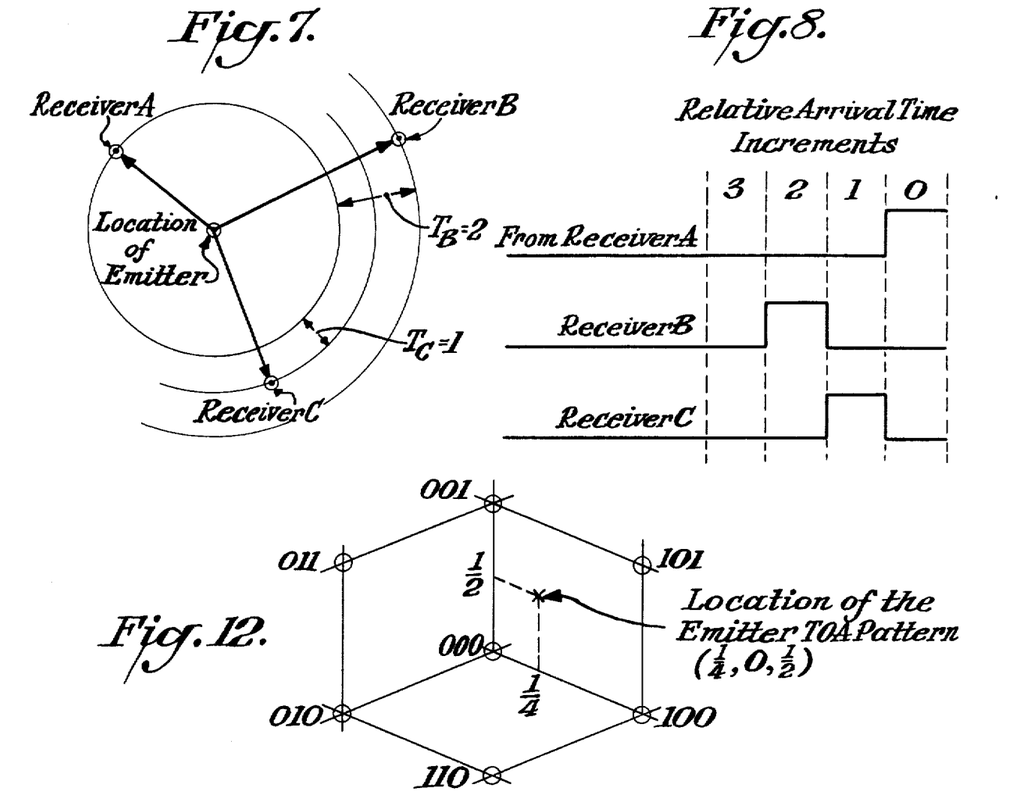
FIG. 7 is an illustration depicting the manner in which the pulse emanating from an emitter is converted into time-varying increments.
FIG. 8 illustrates the wave forms depicting a typical time of arrival pulse pattern obtained from the three receivers of a typical triad for an emitter located as depicted in FIG. 7.
FIG. 12 is an illustration showing an enlarged pattern of the cobweb illustrated in FIG. 10 containing an emitter positioned other that on one of the predetermined matrix intersections, such as at the cobweb location (1/4, 0, 1/2)

The TOA pattern, as seen in the three receiver channels, may be more easily understood with reference to FIG. 8. If the emitter 10 (FIG. 1) is located geographically with respect to the three receivers 12, 14 and 16 such that it is precisely at one of the matrix locations, as depicted in FIG. 7, the pulse arrival times are separated by the delay line increments of the recognition matrix as will be described. In this illustration, the emitter is closest to the first receiver A, is next closest to the third receiver C and is farthest from the second receiver B. The pulse from the first receiver A arrives first and acts as a reference with a zero relative delay, i.e., $T_A = 0$. A pulse arrives second at the third receiver C such that $T_C = 1$. The pulse arrives at the second receiver B last, therefore, $T_B$ is two increments later than at receiver A or $T_B = 2$. This TOA pattern as seen by the three receiver channels 14, 16 and 18 or A, B and C is depicted in the wave forms of FIG. 8. Thus, the TOA pattern has the relative delay increments 0 in channel A, 2 in channel B, and 1 in channel C. The identifying code for this pattern may be given 0, 2, 1 where $T_A$ equals the first digit, $T_B$ equals the second digit and $T_C$ equals the third digit.

Figure 9:
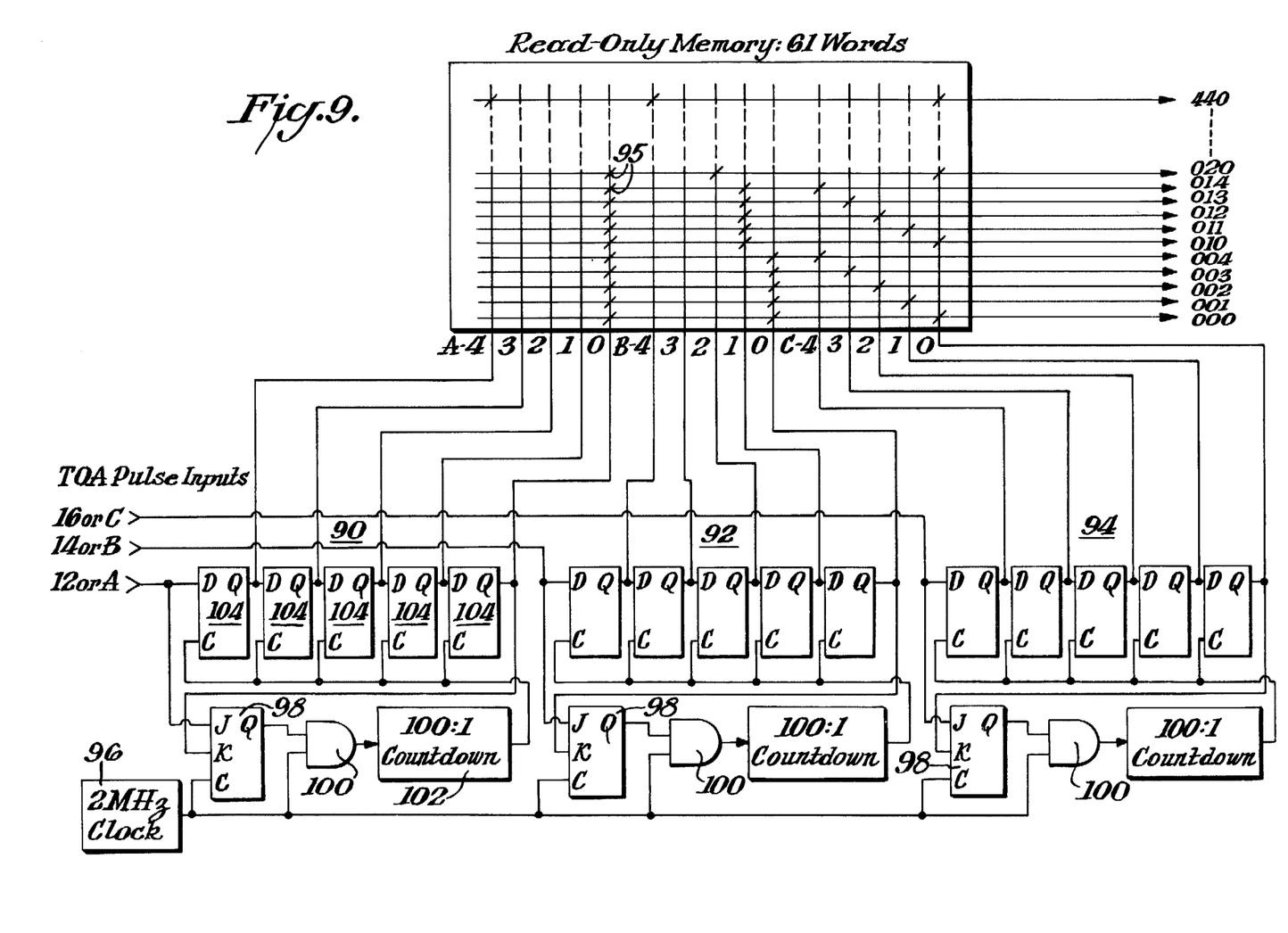
FIG. 9 is a partial block and partial logic schematic diagram of the time of arrival pattern recognition matrix which may be used with the system of this invention.

The time position varying pulses are now applied to a TOA pattern recognition matrix as depicted in FIG. 9. Each of these TOA pulses A, B, and C are applied to a separate delay line or shift register 90, 92 and 94. Each of the shift registers 90, 92, and 94 provide sequential pulse inputs to the several line selection addresses A–O through 4, B–O through 4 and C–O through 4. The matrix itself may be a conventional diode matrix or may be a read only memory in which the line selection addresses are formed by the relative time of arrival patterns of the three signal channels A, B, and C. Only a portion of the read only memory is shown for the sake of simplicity. The diagonal lines 95 at the intersections of the address selection lines with a particular output line 001, 002 through 440 illustrate the matrix logic by which the different input combinations of the TOA pulses activate the several output lines. Only a portion of the output lines are shown for the sake of simplicity.

Each of the shift registers 90, 92 and 94 are identical in operation and may be constructed of a series of clocked flip-flops of conventional design. Each of the flip-flops has a D input which sets the flip-flop upon the receipt of a clock signal at C. This clock signal may be derived from a suitable 2 MHz clock source 96, which is connected to the clock input of a control flip-flop 98 for each of the registers. Each of the control flip-flops 98 also receives the TOA inputs which have been clocked into 0.5 microsecond increments from a different one of the input channels A, B and C. Thus, the first control flip-flop 98 for the register 90 receives an input from the channel A which sets the flip-flop upon the receipt of a clock pulse. When thus set the control flip-flop 98 primes a gate 100 which passes the clock pulses from the source 96 to an appropriate (by way of illustration 100 to 1) countdown divider 102 which then passes clock pulses to each of the flip-flops in the shift register 90. This permits the pulses to be shifted through the shift register 90 at a submultiple of the clock rate, in this illustration a 20 KHz rate. In this manner, a pulse received in channel A, for example, is shifted at 50 microsecond intervals and in this manner is applied sequentially to each of the line addresses A-4, A-3, A-2, A-1 and A-0 in sequence. When this pulse passes through the last of the flip-flops of the shift register 90, it then functions to reset the control flip-flop 98 thereby closing the gate 100 and the register is inactive until the receipt of the next TOA pulse in the channel A. The remaining shift registers 92 and 94 have similar modes of operation.

Thus, the 0.5 microsecond TOA pulses arriving on the channels A, B and C enter their respective shift register delay lines 90, 92 and 94. These delay lines shift the TOA pulses an appropriate submultiple of the clock rate as described. These delay line increments of 50 microseconds define the time-space reference coordinates into which the field of view of a particular triad is divided. For a typical triad of 50 miles in length with the 2 MHz clock rate and the 100 to 1 divide down, this corresponds to the four time increments which are covered by the A-0 through A-4 address lines.

The countdown is initiated substantially at the instant of arrival of a signal in any of the input channels A through C and continues until the pulse is propagated into the last increment of the delay line. During this time no other signal can enter the delay line because no pulse can enter the system until the next time reference pulse 70 (FIG. 5) occurs. When the pulse is propagated to the last increment of the delay line, the control flip-flop 98 is reset and the delay line is ready to accept a new signal.

Figure 10:
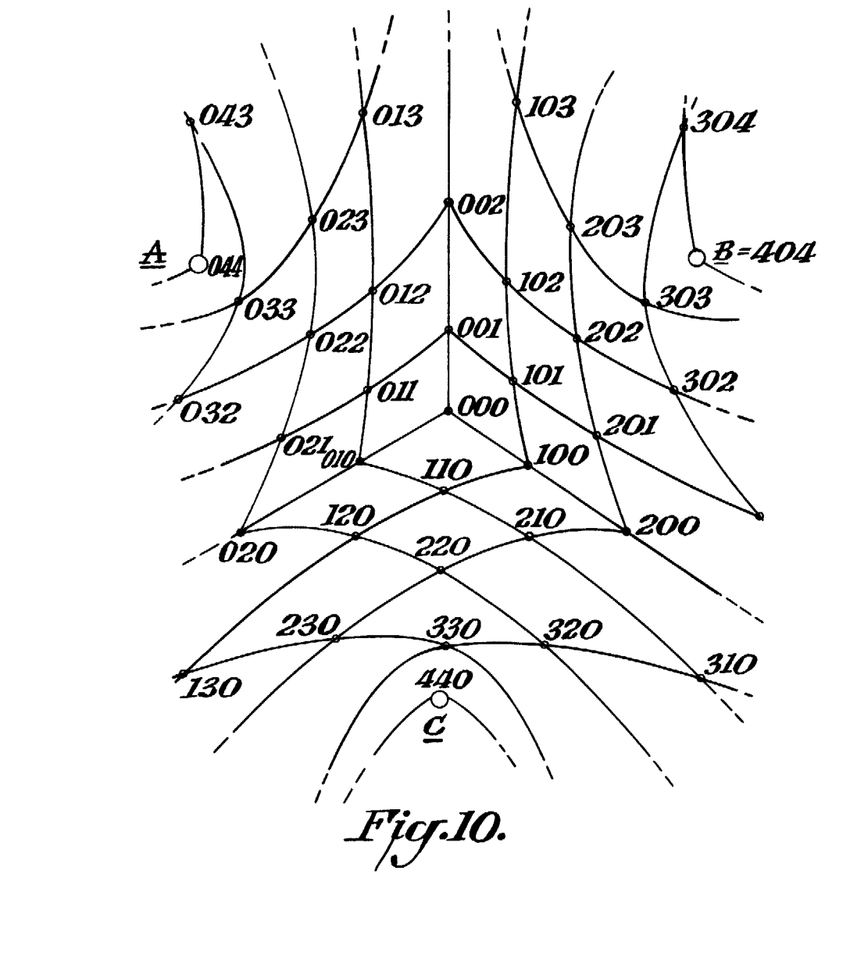
FIG. 10 is a real-world map of hyperbolic intersections, otherwise known as a "cobweb", used in locating emitters in a typical triad in accordance with the system of this invention.

The time-space relationship of the time increments relative to the receivers is depicted in FIG. 10. The location of each of the receivers in the triad is denoted by the points A, B and C. Thus, if the signal is from a hypothetical point in space resulting in the pattern 001 in the recognition matrix of FIG. 9, the signals in channels A and B reach the zeroth (reference) increment simultaneously. At this instant, the signal in channel C is delayed by one time increment. If this condition can be recognized, the location of the signal or emitter is known since the TOA pattern recognition matrix provides this function. The flip-flops of the shift registers are connected to the address lines of the matrix which contain the combination of delay patterns which represents position references in the field of view. Thus, at the instant when the 001 pattern is established in the shift register, there is an output only on the 001 line of the matrix.

In actual practice emitted signals will seldom fall exactly on a reference point determined by the delay line increments as just described. In the illustration earlier given where the signals have an identifying code of 0, 2, 1 it is only this line 021 of the recognition matrix which matches the signal TOA pattern and produces an output. Since this line has been previously associated with the premapped reference point 021 (FIG. 10) the latitude and longitude of the emitter is known.

There are many advantages to utilizing this matrix approach. Among these advantages are that there is no need for costly precision clocks to measure absolute time of arrival as is often necessary using conventional inverse loran methods. Further, no costly and complex system is required to identify each signal pulse so as to assure that the same pulse is being measured at all receivers. No time consuming scanning for correlation peaks is required nor are time consuming calculations for solution to hyperbolic equations required. Finally, there is no need for wideband data links.

The fundamental difference between the system described and other trilateration systems is based on the questions they ask from the received signal data. Conventional systems ask "Do these three signals belong to the same emitter?." Then they compute emitter location. This approach leads to immense difficulties in identifying signals. The system of this invention asks "Do these three signals belong to the same location?." If yes, the emitter is located. If no, the data is rejected as being noise or intereference. Emitter identification is done subsequently by statistical averaging after location.

In practice the TOA pattern map is prepared upon installation of each triad by feeding the coordinate data of the receiver stations into a computer. In this way all the calculations are done only once and for all times instead of once each time a pulse is received as in most trilateration systems. A further important advantage of the TOA pattern recognition matrix is that noise and interference originating outside the mapped field of view are automatically rejected - there are no corresponding matrix intersections. This greatly improves the overall system detection sensitivity. As a byproduct, any unauthorized emissions within the region can be located and identified. Even intermittent varying carrier frequencies may be located since this system is wide open in both time and frequency continuously. It should be noted that the full range of 61 possible TOA delay patterns as shown in the illustrated matrix of FIG. 8 will include certain regions that relate to ambiguous (true value) emitter locations. These regions are caused by curvature of the hyperbolic line in the extreme fringes of the field of view. Resolution of these ambiguities is accomplished in practice by eliminating this region of coverage by simply removing the recognition gate which corresponds to these regions. There is negligible effect of this truncation on system coverage and performance.

Further, in accordance with this invention, to improve the accuracy of the system beyond that represented by the discrete points designated by the recognition combination provided by the recognition matrix, it is necessary to provide for an interpolation routine. The number of discrete recognition gates that can be physically tolerated increases linearly. Therefore, hundreds of millions of gates would otherwise be needed to obtain the precise location which is needed in most applications. In accordance with this invention this problem is obviated by utilizing a method and system to interpolate smoothly between the geographical positions which are defined by the discrete reference points 021 and the like depicted in FIG. 10. By interpolation relatively few reference points with their associated logic gates are needed to obtain a high resolution location measurement. Thus, a typical 61 gate matrix or truncated version thereof, as illustrated in FIG. 9, can, by using interpolation, provide a relatively high degree of precision.

Figure 11:
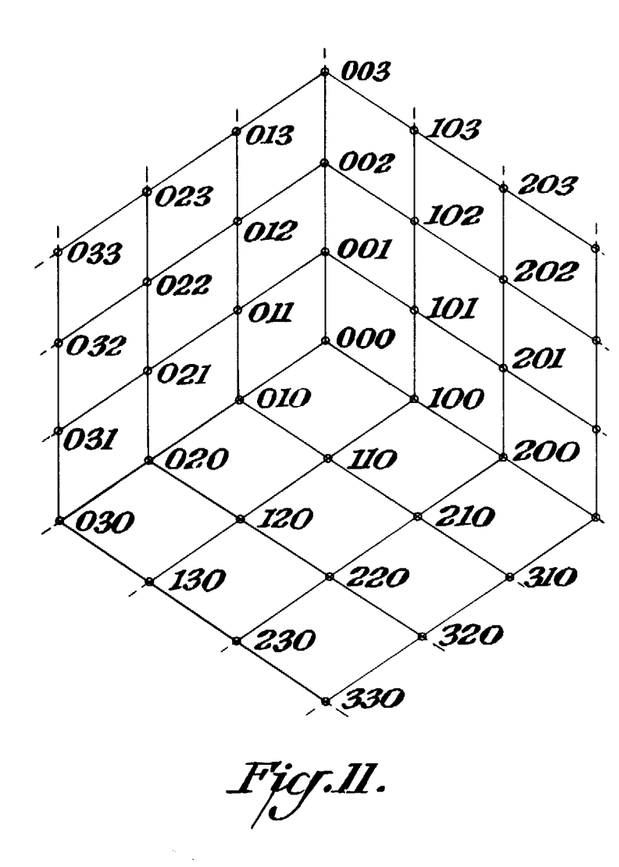
FIG. 11 is the cobweb illustrated in FIG. 10 linearized to provide equal-distance time difference spaces.

The first step in the interpolation process is the transposition of the real-world map of hyperbolic intersections or "cobweb" illustrated in FIG. 10, which occur at the intersections of the delay line determined time increments, which are depicted by equal time difference hyperbolas, into a map such s that depicted in FIG. 11 in which the reference points represent equally spaced time difference increments. This transformation brings out the sequential relationships of the time delay patterns. Referring to FIG. 11 it may be noted that there are three orthogonal surfaces, that in which the first digit of the point locations are 0, that in which the second digit of the reference point is 0, and finally that in which the third digit of the reference point is 0. The invarying 0 elements in each reference pattern correspond to the receivers A, B or C which first receives the signal. The other two digits vary along the X and Y axis according to their increasing distance, in discrete time delay units or increments, from the transmitter to the respective receivers. Each of the planes has the same sequence except for the transposition of the variable digits. Thus, each plane can be treated independently and the interpolation is performed with respect to the position of the emitters TOA pattern within a plane.

For ease of explanation, each reference point in the linearized cobweb of FIG. 11 may be considered as a terminal attached to the corresponding recognition line of the matrix of FIG. 9. Thus, for continuity of description, the same reference numerals will be used corresponding to the respective gates of the recognition matrix (FIG. 9). As noted hereinefore, if an emitter is located directly on a reference point, only the matching recognition line will produce a pulse. For example, $S_{021}$ is the signal produced by an emitter located at reference point 021 as previously described. The width of this pulse will be equal to the delay time increment of the shift register which adresses the matrix. In the example given with the 2 MHz clock pulse with the 100 to 1 countdown, this delay increment is 50 microseconds. Thus, for each delay line or shift register, there are a total of 200 microseconds covering the four recognition delay increments 0–3.

The interpolation method and system is based on the fact that for any signal that is not located on a reference point, the arrival times of the pulses A, B, and C do not fall precisely within the delay increments as illustrated in FIG. 8. Since the pulses do not fall within these increments, there is an overlap of the pulses in the several recognition delay increments. This overlap is recognized or detected by the matrix so that the outputs of the matrix are pulses from the nearest three recognition lines within the "square" containing the signal and only from these lines. Furthermore, these pulses will have widths which are proportional to the offset of the original signal TOA pattern from the patterns of the respective reference points.

This is more clearly illustrated in the illustration of FIG. 12 in which three "squares" of the linearized cobweb of FIG. 11 are illustrated. In this example, the emitter will be assumed to be located at ½ on the Y axis and ¼ on the X axis in the B plane (corresponding to the receiver 14). The coordinate is thus designated ¼, 0, ½. The recognition signals are derived from the nearest lines, i.e., $S_{000}$, $S_{101}$, and $S_{001}$. There is no output from the recognition gates on line $S_{100}$ because only the three nearest lines can produce an output - only their input pulses from the delay lines overlap in time to permit recognition. The recognition pulses appear in sequence and never appear simultaneously due to the time position of the TOA pulses. Their widths are fractions of the constant recognition delay interval of 50 microseconds in this illustration, and are normalized in amplitude. Each pulse thus represents an element of electrical energy, in proportion to its pulse width, signifying an element of the precise location of the emitter. This permits the subsequent interpolation system, as will be described, to operate on an amplitude-time weighting basis so as to compute the centroid of their distribution along the X and Y axes and thereby precisely locate the emitter.

Figure 13:
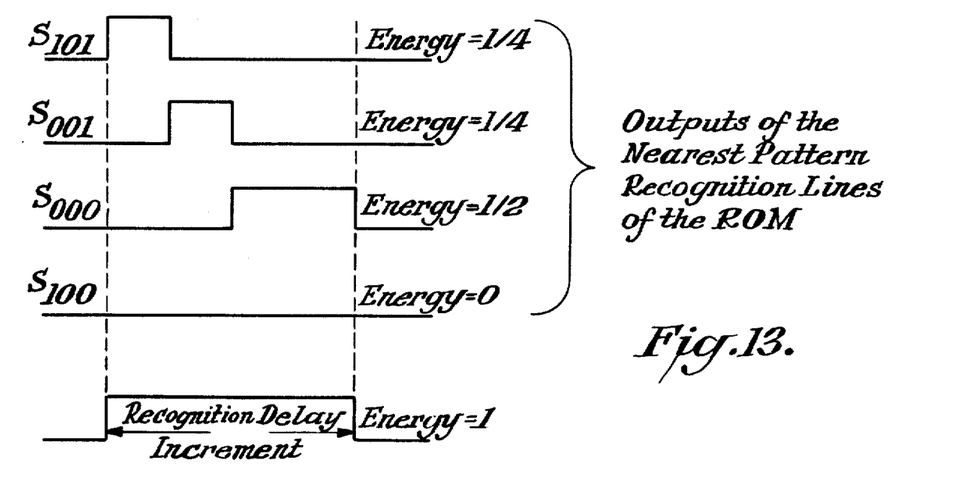
FIG. 13 depicts the time-varying timing wave form that occur at the output of the recognition pattern lines of the recognition matrix for a hypothetical emitter located as illustrated in FIG. 11.

The widths of the pulses appearing on the several output lines of the matrix have widths which are fractions of the constant recognition delay interval and are illustrated typically in FIG. 13. Thus, the output on the line $S_{101}$ has an energy content of ¼ and occurs during the first quarter of the recognition delay increment. In similar manner the pulse on the output of recognition line $S_{001}$ has an energy content of ¼ of the total recognition delay increment and occurs during the second quarter of the increment. Finally, the output of the recognition line $S_{000}$ contains an energy content of one-half of the total delay increment and occurs during the last 2 quarters of the time interval. As noted, the output on the line $S_{101}$ contains no energy. These particular time spacings occur due to the timing sequence of the TOA pattern and as noted is dependent upon when the several pulses arrive and hence are shifted through the shift register. Those pulse outputs which have coinciding time periods at the input to the recognition matrix provide the outputs having the energy contents indicated in terms of some fraction of the total recognition delay increment.

Figure 14:
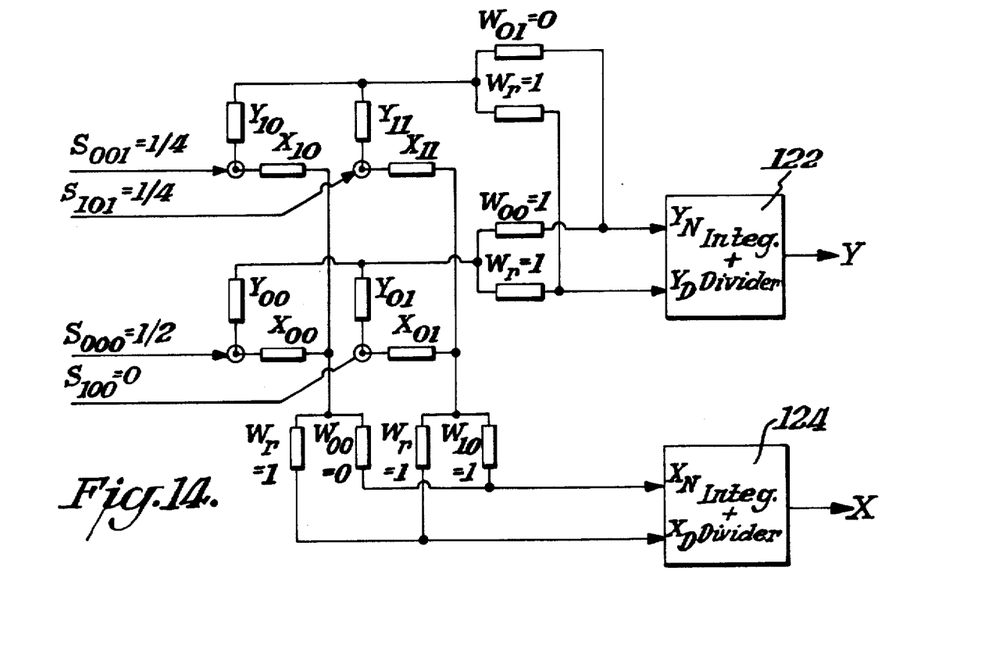
FIG. 14 is an illustration of a summing network that may be used for the interpolation of single square of one plane of a typical triad for an emitter located as depicted in FIG. 12.

To interpolate using the simplified matrix of FIG. 14, from the time and energy distributions of the outputs of the recognition lines for the single square, the signals varying in time from each line are summed along each axis using the summing resistors $X_{00}$, $X_{01}$, $X_{10}$, $X_{11}$, $Y_{00}$, $Y_{01}$, $Y_{10}$, $Y_{11}$ and the multiplying resistors $W_{01}$, $W_r$, and $W_{00}$ and then each column and row is weighted or integrated and divided, by integrator and divider networks denoted by the blocks 122 and 124 respectively according to their position along each axis as is typified by the equations for a centroic computation. Such networks 122 may be of conventional design. These equations for a centroid computation are given by:

$$\bar{X} = \frac{1}{n} \sum_{j-1}^{n} \sum_{i-0}^{m} j \, x_{ij} \, S_{ij}$$

$$\bar{Y} = \frac{1}{m} \sum_{i-1}^{m} \sum_{j-0}^{n} i \, y_{ij} \, S_{ij}$$

where
x = horizontal weighting
y = vertical weighting
m = number of x reference elements
n = number of y reference elements j = index on the x axis
i = index on the y axis
$S_{ij}$ = signal input at the designated element
(Note: usually $m = n$)

A sample computation using the summing network depicted in FIG. 14 and produces the result:

LATITUDE $$\frac{Y_N}{Y_D} = \bar{y} = \frac{w_{00}(y_{00}s_{000}+y_{01}s_{100}) + w_{01}(y_{10}s_{001}+y_{11}s_{101})}{y_{00}s_{000}+y_{01}s_{100}+y_{10}s_{001}+y_{11}s_{101}}$$

$$= \frac{1 \times (1/2 + 0) + 0 \times (1/4 + 1/4)}{1/2 + 0 + 1/4 + 1/4}$$

$$= \frac{1}{2}$$

Longitude $$\frac{X_N}{X_D} = \bar{x} = \frac{w_{00}(x_{00}s_{000} + x_{10}s_{001}) + w_{10}(x_{01}s_{100} + x_{11}s_{101})}{x_{00}s_{000} + x_{10}s_{001} + x_{01}s_{100} + x_{11}s_{101}}$$

$$= \frac{0 \times (1/2 + 1/4) + 1 \times (0 + 1/4)}{1/2 + 0 + 1/4 + 1/4}$$

$$= \frac{1}{4}$$

$Y = 1/2$ and $X = 1/4$ which is the correct location for the emitter assumed in the B plane.

Figure 15:
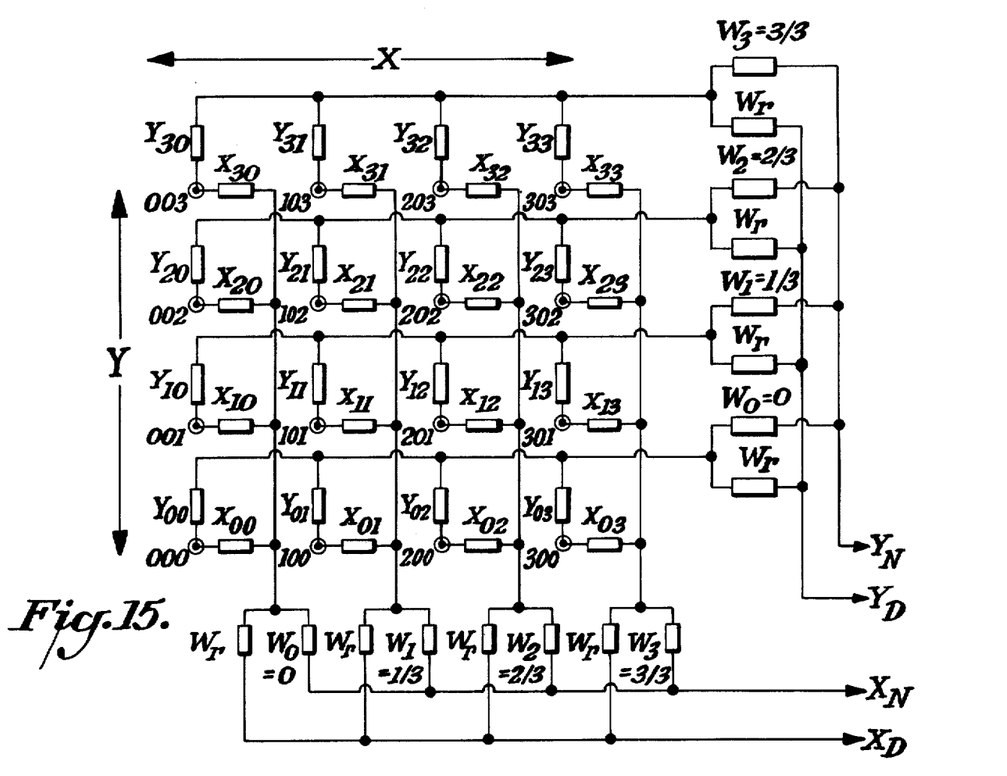
FIG. 15 is an illustration of a summing network that may be used for the interpolation of a single plane in the system of this invention.

This same procedure can be extended to an entire plane of many squares as is illustrated in FIG. 15 by the summing network for interpolation of the single B plane. The input terminals are designated by the recognition line codes 000, 100, etc. for the B plane. The $x$ summing resistors have the designations $x_{00}$, $x_{01}$, etc., the $y$ summing resistors have the designations $y_{00}$, $y_{01}$, etc., while the multiplying resistors $w_1$, $w_2$, $w_3$, $w_4$, and $w_r$ have the normalized values indicated. The longitude and latitude of the emitter is given by the centroid equations:

$$\text{Latitude} = \bar{y} = \frac{0 \sum s_{0j} + \frac{1}{3}\sum s_{1j} + \frac{2}{3}\sum s_{2j} + \frac{3}{3}\sum s_{3j}}{1}$$

$$\text{Longitude} = \bar{x} = \frac{0 \sum s_{i0} + \frac{1}{3}\sum s_{i1} + \frac{2}{3}\sum s_{i2} + \frac{3}{3}\sum s_{i3}}{1}$$

(In these equations, all $x$'s and $y$'s are $= 1$)
For the sake of clarity, the centroid equations here assume that the $x$ and $y$ summing resistors have unit weighting. Also the integration networks are omitted.

The last remaining step is to convert the signal location relative to the linearized cobweb of FIG. 11 back to its real world position. This can be done either by adjusting the weights of the $x$ and $y$ summing resistors or by applying a correction factor to the linear coordinate measurement. Since each installation would have its own unique mapping, the weight values must be computed for each system after installation. This information as to position of the emitter is then transmitted into the processing computers for display and dispatch of rescue operations as previously described.

While the foregoing interpolation description has been in terms of analog techniques, the same results can be achieved by digital interpolation using a read only matrix (ROM) containing precomputed weighting information. Replacing each resistive weighting element of the interpolation array there is now a digital number representing the $x_{ij}$ and $y_{ij}$ weighting including the centroid weighting. Each row or line of ROM corresponds to a reference point and to a line of the recognition matrix. Each stored number contains the number of bits needed for the specified system measurement resolution (for example, a 10 bit number should give 0.1 % resolution).

The presence of the pulse on a line of the recognition matrix adresses the same line of the interpolation ROM. Instantaneously two parallel binary words containing the associated $x$ and $y$ weighting factors are produced. Since the TOA recognition pulses are incremented by the system main timing clock, the series of digital words are produced which represent samples of the wave form equivalent to those of the analog interpolator. From this point, any one of several known methods can be used to integrate the data so as to obtain the final coordinate measurements as in the analog system. The main advantages of digital interpolation are the immunity from component variation and the convenience in changing the weighting by reprogramming.

The advantages of this time of arrival matrix and system are many. By utilizing the digital measurement of the relative time of arrival of the pulses from the receivers of each triad, low-cost data links are possible. Furthermore, the system has a high degree of reliability and yet reduced installation and maintenance cost. By using the interlinked triads, controlled area coverage is attainable which is essence removes outside interference since it will not be recognized by the recognition matrix. The recognition matrix further reduces the effects of propagation anomalies since it permits the use of narrowband pulses, hence, the system may be operated in the normal marine band of 1.6 to 2.0 MHz optimum propagation and detection sensitivity is available within a typical 50 mile range. There are no shadowed areas and reflections as would normally occur in UHF and microwave systems. Operation is quite reliable. By using a pulse signal having a low duty cycle, multiple emitter processing is possible on the same frequency channel and has very low drain on the average transmitter.

In conventional trilateration methods, most require a receiver at the emitter location in order to provide a time or phase reference. This is not required with the system and method disclosed due to its time difference pattern recognition method of operation. Furthermore, using microwave signals in conventional trilateration systems the multipath effects which are severe in the UHF and microwave frequency ranges, causes many errors. Since the emitter vehicle requires no receiver, and since the remote trilateration receivers can be located under optimum conditions with electrically long antennae and generally removed from local noises, a high degree of accuracy is possible in the lower frequency ranges which other trilateration systems often cannot attain.

While much of the method and system thus far described are illustrated as utilizing basic specialized hardware, it is to be understood that a suitable software system for achieving this end is illustrated in FIG. 16. Thus, the input from the three sensors, or receivers A, B and C, transmitted over communication channels using the modems as described hereinbefore, are inputted into a unit 120 which formats the data for computer input. The main functions of this interface 120 are to convert the binary coded decimal data into a format acceptable to the time sharing computer and to provide an input-output terminal for the operator. One suitable interface is that provided by the Hewlett-Packard Company in their Model H–P 2575A coupler controller. This unit is designed to interconnect four remote sensor data sources with a central general purpose computer and an operator's control keyboard/display terminal.

Since the output of the modem is in serial binary coded form, the time of arrival measurement must be received and stored in a serial-to-parallel shift register to comply with the input requirements of the coupler controller. This instrument translates the binary coded decimal to ASCII (American Standard Code For Information Interchange) characters which are then compatible with the time sharing data format. It also contains decoders and switching functions which respond to the two-way commands generated by the operator in the computer program.

This input time of arrival information, properly formatted, is then searched to identify which of the three channels has the largest number. This channel is then established as a reference delay channel. Next the smaller TOA numbers are subtracted from this reference to establish a numeric TOA pattern of the signals. This numeric TOA pattern is compared against a catalog array of precomputed TOA location patterns. The elements of the array closest to the TOA pattern of the signal are then interpolated to identify the emitter location coordinates. Finally, as a last step, the emitter coordinates may be displayed by conventional methods.

In effect then the system operates in two sequences: data acquisition and data display. While in the data acquisition mode, the TOA measurements are processed by the computer program, averaged and stored. After an appropriate acquisition and averaging interval, the computer switches to the display mode. Here, the coordinates of the emitter locations are printed out and/or displayed in a map overlay. If cathode ray tube displays are used, the readout interval can be very short. This permits rapid cycling between acquisition and display so that loss of signal during the display mode can be minimal.

It is to be understood that while this system and method have been described only in connection with geographical coordinate location, it may as noted previously, be used for geometric coordinate space in which case the TOA patterns are derived from time encoded analogs of physical measurements from various sensors. Whatever the particular application, all of the systems and methods have certain generalized features which include:

1. The input information is contained or encoded in the relative time delay difference, or TOA pattern, between the two or more sensor channels, e.g., propagation delay time, temperature degrees. etc/

2. The TOA pattern recognition matrix is a logic array arranged to represent predetermined discrete time delay increments as reference points in a continuous functional space which is defined by the appropriate encoded parameters, e.g., latitude vs. longitude or relative humidity vs. temperature.

3. Application of the signal TOA pattern, by any of several possible means, to the recognition matrix causes an output from only those elements of the matrix which match the TOA pattern at a given instant, as the signals sequentially interrogate all of the defined combinations of connections in the array, where each combination corresponds to a reference point.

4. The coarsely quantized time-variable signal output of the recognition logic is interpolated in an array of variable-gain weighting devices using a centroid computing technique.

5. Adjustment of the weighting in each element of the interpolation array enables correction for the distortion of the original measurement space which occurs because of the time increment quantization.

6. The defined measurement space can be limited in size or shape, as desired, by suitable arrangement of the logic gate connections so as to eliminate undesired or ambiguous responses.

In alternative embodiments, the system of this invention can be implemented using optical filtering techniques by substituting a mask for the logic array, if desired. As noted hereinbefore, there is a possibility that a signal TOA pattern may arise such that it spans two counting frames. This, however, has a low probability because the maximum TOA time difference, for the illustrative clock rates, is about 250 microseconds for a 50 mile triad as compared to the 16,680 microsecond frame interval determined by the television sync pulses. The probability of a "split" TOA pattern is thus not more than 0.015. If a split occurs, the TOA pattern is rejected for those frames experiencing the split. The next emitter pulses forming an appropriate TOA pattern will be recognized.

It is obvious that many embodiments may be made of this inventive concept, and that many modifications may be made in the embodiments hereinbefore described. Therefore, it is to be understood that all de-

What is claimed is:

1. A system for locating a point constituting an emitter in a continuous functional space defined by at least a pair of parameters comprising, in combination,
   sensor means for receiving manifestations from said emitter,
   means for encoding said manifestations in terms of relative time delay differences between the manifestations derived from different ones of said sensor means, and
   comparator means for comparing the time of arrival pattern of said manifestations with a catalog of stored manifestations corresponding to predetermined sets of relative time difference patterns of said manifestations corresponding to different reference points in said space and providing a discrete output manifestation corresponding to the coarse location of said point in terms of said reference points.

2. A system according to claim 1 wherein said comparator means is a recognition logic array constructed to represent predetermined discrete time delay increments of said manifestations as said reference points.

3. A system according to claim 2 which includes means for sequentially applying said time of arrival pattern to said array in discrete time increments, said logic array providing a coarsely quantized time-variable manifestation corresponding to the location of said point.

4. A system according to claim 3 which also includes interpolation means for interpolating said time-variable manifestations, thereby to locate precisely said point in said space.

5. A system according to claim 1 which includes as said emitter a transmitter located at said point for transmitting signals to said sensor means.

6. A system according to claim 5 wherein each said sensor means includes
   a first receiver means for receiving said transmitted signals,
   a second receiver means for receiving a common time reference signal, and
   counting means for establishing a count signal corresponding to the time interval between said reference signal and said transmitted signal, thereby to provide a time of arrival count signal.

7. A system according to claim 6 which also includes means for transferring said time of arrival count signals from each said sensor means to said encoding means.

8. A system according to claim 7 wherein said encoding means includes a digital to analog converter means for converting each of said count signals into a time varying signal corresponding in time position to the location of said point.

9. A system according to claim 8 wherein said encoding means includes a clocked shift register for each said time varying signal for sequentially presenting said time varying signals to said comparator means only for predetermined time intervals after the arrival of each set of count signals.

10. A system according to claim 8 wherein said encoding means includes a clocked shift register for each said time varying signal for dividing each said time varying signal into increments, thereby to form a time of arrival pattern of signals for each said sensor means for presentation to said logic array.

11. A system according to claim 10 wherein said logic array is responsive to said time varying signal increments to provide quantized time-varying signals from reference points that are close to said point.

12. A system according to claim 11 which also includes interpolation means responsive to said quantized time varying signals for converting them to amplitude modulated signals corresponding to said point.

13. A system according to claim 3 wherein said manifestations are signals and wherein said logic array is responsive to said time varying signal increments to provide quantized time-varying signals from reference points that are close to said point.

14. A system according to claim 13 which includes display means responsive to said amplitude modulated signals for displaying the coordinates of said point.

15. A system according to claim 1 wherein said point is supplied with a means for generating manifestations.

16. A system according to claim 1 wherein three parameters define each said measured point, said space is geographic space, and said time of arrival patterns are related to the propagation time of waves between said emitter and each of said sensor means.

17. A system according to claim 16 wherein said encoding means includes a clocked shift register for each said time varying signal for dividing each said time varying signal into increments, thereby to form a time of arrival pattern of signals for each said sensor means for presentation to said logic array.

18. A system according to claim 17 wherein said logic array is responsive to said time varying signal increments to provide quantized time-varying signals from reference points that are closed to said point.

19. A system according to claim 18 which also includes interpolation means responsive to said quantized time varying signals for converting them to amplitude modulated signals corresponding to said point.

* * * * *